(No Model.) 2 Sheets—Sheet 2.

T. SHIRLEY.
MACHINE FOR MANUFACTURING HAT BODIES.

No. 373,205. Patented Nov. 15, 1887.

WITNESSES: INVENTOR:
H. Edward Reeve Thomas Shirley,
Oscar A. Michel. BY Drake & C ATT'YS.

N. PETERS, Photo-Lithographer, Washington, D. C.

UNITED STATES PATENT OFFICE.

THOMAS SHIRLEY, OF NEWARK, NEW JERSEY.

MACHINE FOR MANUFACTURING HAT-BODIES.

SPECIFICATION forming part of Letters Patent No. 373,205, dated November 15, 1887.

Application filed April 9, 1887. Serial No. 234,245. (No model.)

*To all whom it may concern:*

Be it known that I, THOMAS SHIRLEY, a citizen of the United States, residing at Newark, in the county of Essex and State of New Jersey, have invented certain new and useful Improvements in Machines for Manufacturing Hat-Bodies; and I do hereby declare the following to be a full, clear, and exact description of the invention, such as will enable others skilled in the art to which it appertains to make and use the same, reference being had to the accompanying drawings, and to letters of reference marked thereon, which form a part of this specification.
The object of this invention is to facilitate the manufacture of hat-bodies by reducing the amount of labor heretofore required in such manufacture and by a better preparation of the wool or material used in said hat-bodies.
Heretofore it has been necessary for a man to stand by or near the cone while the hat was being formed and from time to time to remove the body and cone from the machine and immerse them in a tub of water prepared for that purpose. Before removing the cone it has also been the custom to cover the said body with a "top cloth," a "side cloth," and an extra cloth to keep the wool in its place, which operation involves considerable labor and loss of time.

The invention consists in certain arrangements and combinations of parts, which will be hereinafter shown and described, and finally pointed out in the several clauses of the claim.
More especially does it consist in the mechanism employed to prepare the wool and distribute it upon the cone prior to the wetting process.

Figure 1:
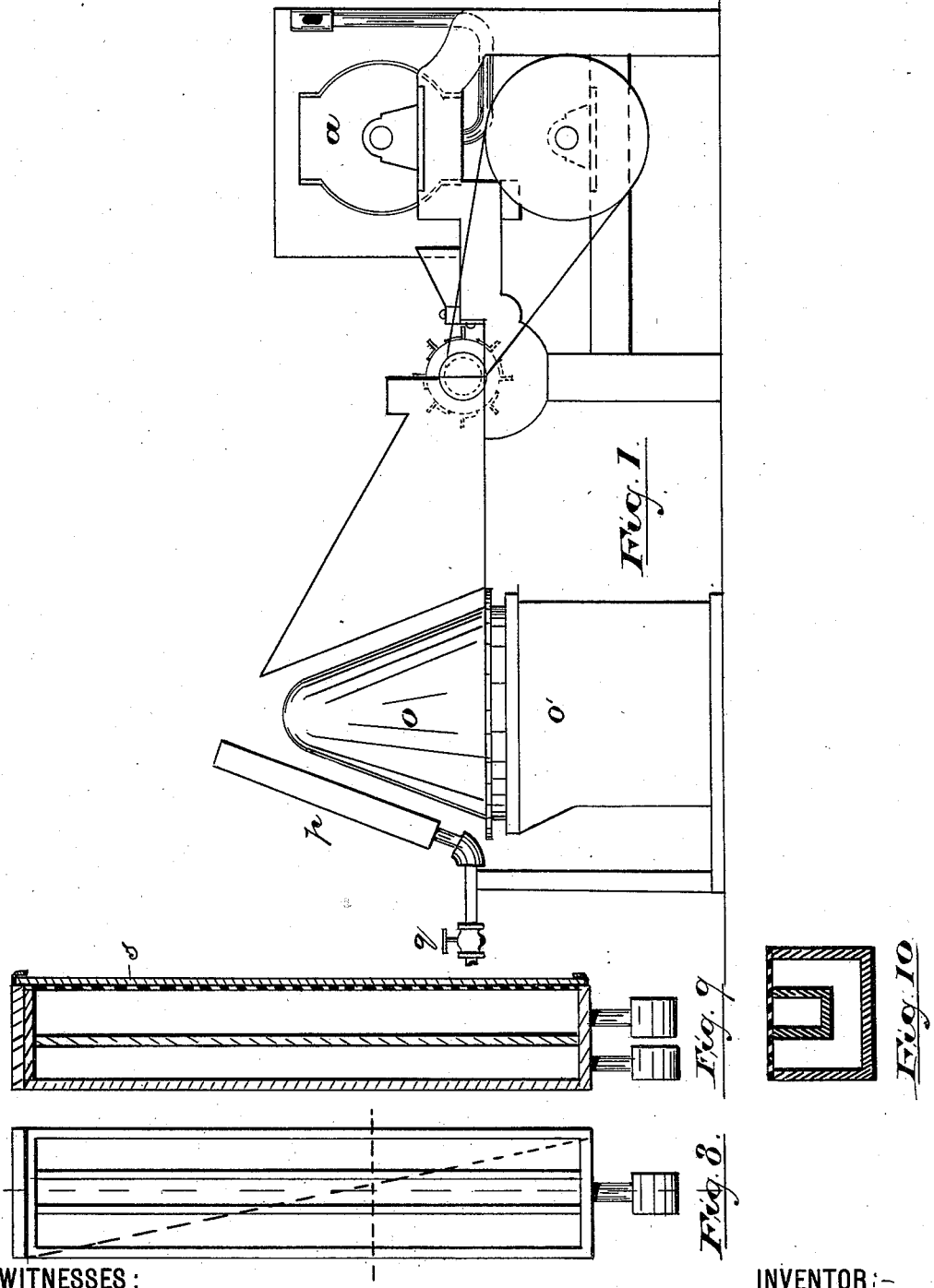
Figure 2:
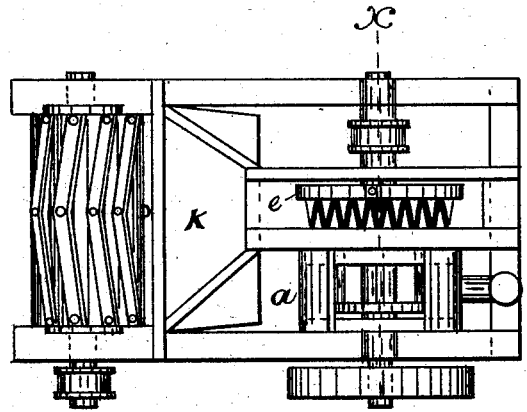
Figure 3:
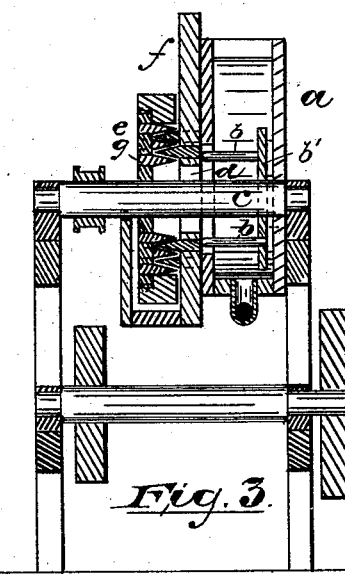
Figure 4:
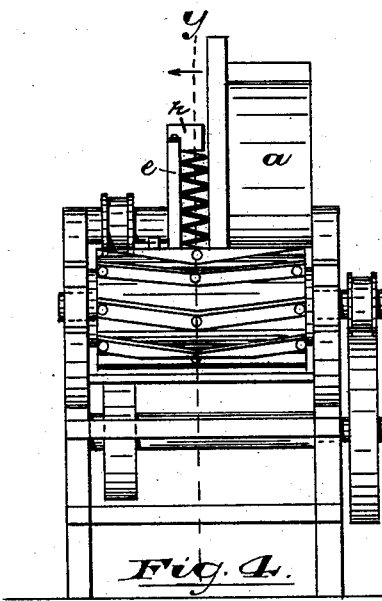
Figure 5:
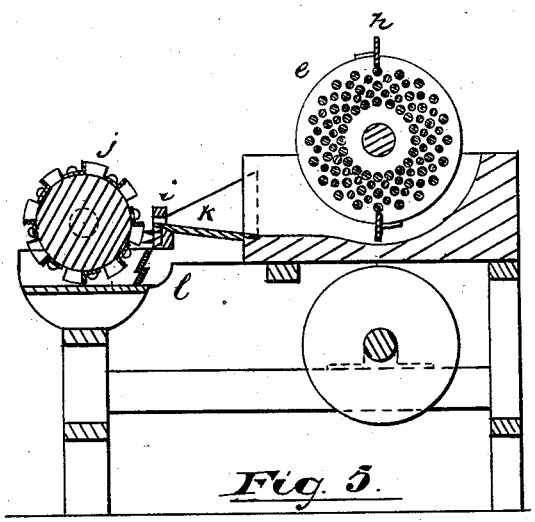
Figure 6:
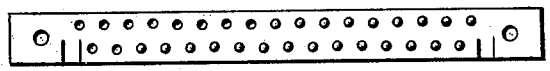
Figure 7:
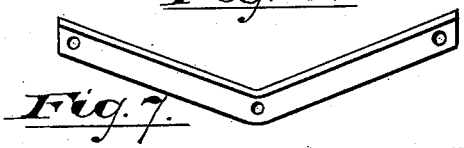

Referring to the accompanying drawings, comprising two sheets, in which like letters of reference indicate corresponding parts in each of the several figures, Figure 1, Sheet 1, is a side elevation of a hat forming and wetting machine embodying my improvements. Fig. 2, Sheet 2, is a plan of the fur-distributing portion thereof. Fig. 3 is a sectional view taken through line X of Fig. 2. Fig. 4 is an end view of said machine. Fig. 5 is a longitudinal section taken through line y of Fig. 4.
Fig. 6 is a plan of a toothed strap or comb adapted to co-operate with a picker-cylinder, and Fig. 7 is a plan of a rib adapted to be applied to said cylinder. Figs. 8, 9, and 10, Sheet 1, are detail views of a wetting device which will hereinafter be set forth.

In said drawings, $a$, Figs. 1, 2, 3, and 4, indicates a chamber, in which the fur or wool is placed in bulk in quantities about sufficient for a single hat-body. Said chamber or receptacle is provided with perforated side walls, Figs. 2 and 4, which allow the entrance of the air to the fur. Within said chamber suitable arms, $b$, projecting from a disk, $b'$, revolve on a driving-shaft, $c$, to disintegrate or separate said fur and cause the same to pass through an opening, $d$, Fig. 3, into contact with a revolving disk, $e$, Figs. 2, 3, 4, and 5. Said disk $e$ is provided on the flat inner face thereof with a series of teeth or projections, $g$, which co-operate with similar teeth projecting from a side portion, $f$, of the frame, Figs. 2, 3, 4, and 5, to which the receptacle or chamber $a$ is secured. The fur passing from the said receptacle or chamber through said opening $d$ is torn apart or separated by said teeth $g$. The said disk is provided with a fan or fans, $h$, Figs. 2, 3, 4, and 5, by means of which the fur, when loosened, is forced between a clearing-bar, $i$, and bed $k$ against a revolving picker-cylinder, $j$, Figs. 1, 2, 4, and 5, where it is still further separated in passing between said picker and comb-teeth $l$, Figs. 5 and 6. Said picker-cylinder is provided on its periphery with ribs or fans $m$, as indicated in Figs. 1, 2, 4, 5, and 7, which prevent the comb $l$ from becoming clogged with the fur in its passage to the cone. Said fans or ribs converge at the center from the outer ends of the cylinder, as indicated in Fig. 7, whereby the fur is drawn toward the center of the comb and prevented from passing out at the ends of the cylinder in tufts, as would otherwise be its tendency.

After passing from the cylinder the fur is distributed upon the cone $o$, revolving on the table $o'$, and is held in place on said cone by suction, caused by revolving fans beneath said table and cone, in the usual manner.

As before intimated, it has been the custom heretofore for an operator to stand by or near the cone while the hat-body was being formed, and from time to time submerge the cone and the partially-formed hat-body in a tank or tub close at hand.

By the improved method the fur is wet automatically while it is being formed on the cone, and without being removed therefrom, the suction produced by the fans or exhaust mechanism causing the water to be distributed over the surface and into the material.

To supply the cone automatically with water or steam while the hat is being formed, I have constructed and arranged a perforated pipe or chamber, p, connecting with a supply-pipe. Said perforated pipe is arranged in close proximity to said cone and hat-body, and at such an angle as may be desired to secure efficiency. A suitable valve or valves, q, are provided, whereby the attendant may turn on or off and otherwise control the supply of steam or water to the hat-body. I may, should I so desire, divide this said pipe or chamber into compartments, as in Figs. 8, 9, and 10, and admit thereto both steam and water, which, passing together through the perforated front of the pipe, form a hot spray.

The perforated front of the pipe p may, if desired, be provided with a sliding plate or cut-off, s, to increase or diminish the height or quantity of the spray in accordance with the size of the cone and body formed thereon, as will be understood upon referring to Figs. 8 and 9.

The special means for and the process of wetting hat-bodies above described I do not claim herein, but reserve the same for another application.

Having thus described my invention, what I claim as new, and desire to secure by Letters Patent of the United States, is—

1. The combination of a fur-receiving chamber or receptacle, as a, arms or beaters projecting from a suitable disk and adapted to revolve therein to disintegrate the fur, and a revolving toothed disk adapted to receive and further disintegrate said fur as it passes from said chamber a, substantially as and for the purposes set forth.

2. The combination of a revolving toothed disk, as 2, provided with a fan or fans, as h, and a revolving cylinder, as j, and comb, as l, and arranged and adapted to operate as described, substantially as and for the purposes set forth.

3. The combination of a picker-cylinder, as j, clearing-bar, as i, bed, as k, and toothed disk, as e, arranged and adapted to operate substantially as and for the purposes set forth.

4. The combination, with a hat-forming machine, of a revolving cylinder provided on its periphery with ribs or fans, as m, converging from the ends to or at the center thereof, substantially as and for the purposes set forth.

In testimony that I claim the foregoing I have hereunto set my hand this 21st day of March, 1887.

THOMAS SHIRLEY.

Witnesses:
OLIVER DRAKE,
CHARLES H. PELL.